Aug. 14, 1945.   H. C. KRAMER   2,382,319
CRAB NET
Filed May 8, 1944   3 Sheets-Sheet 1
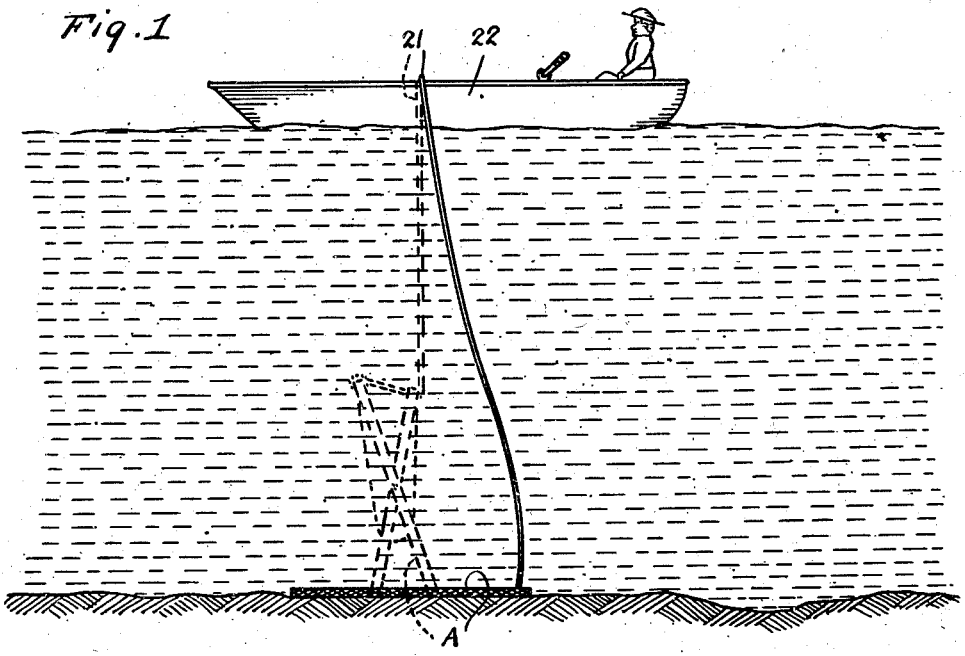
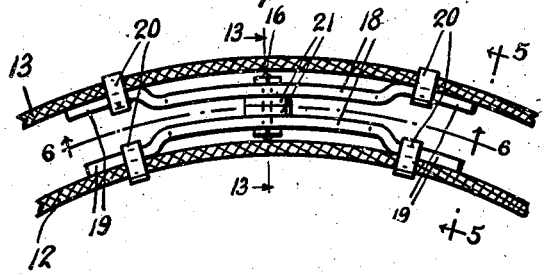
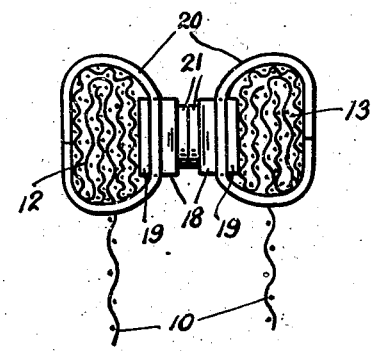
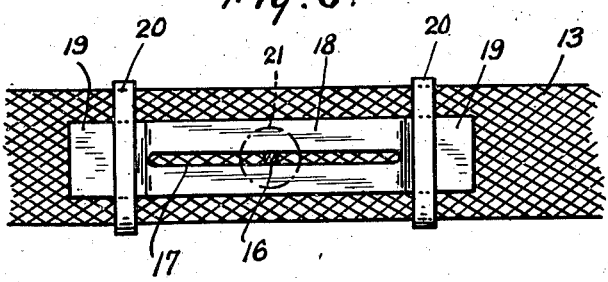
INVENTOR.
Herman C. Kramer
BY
Victor J. Evans & Co.
ATTORNEYS

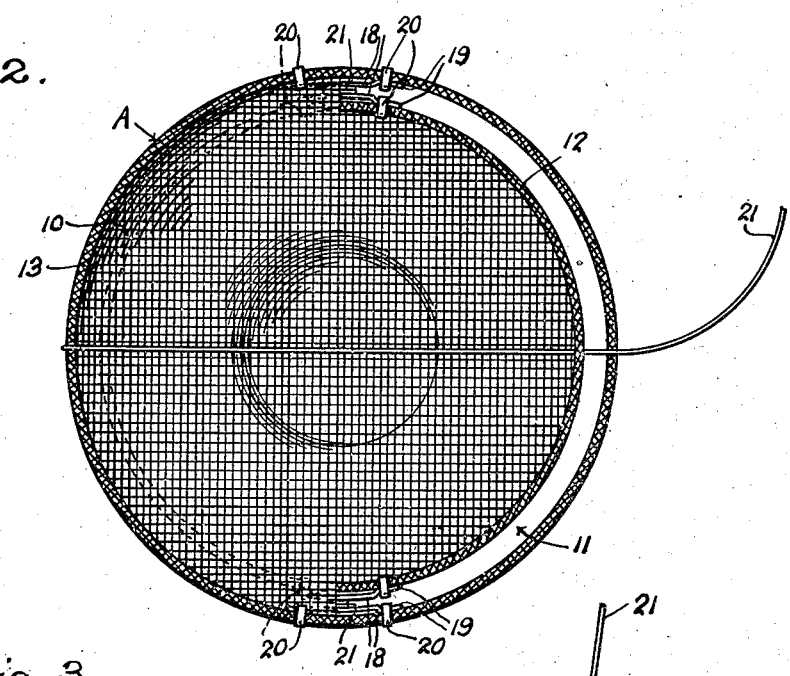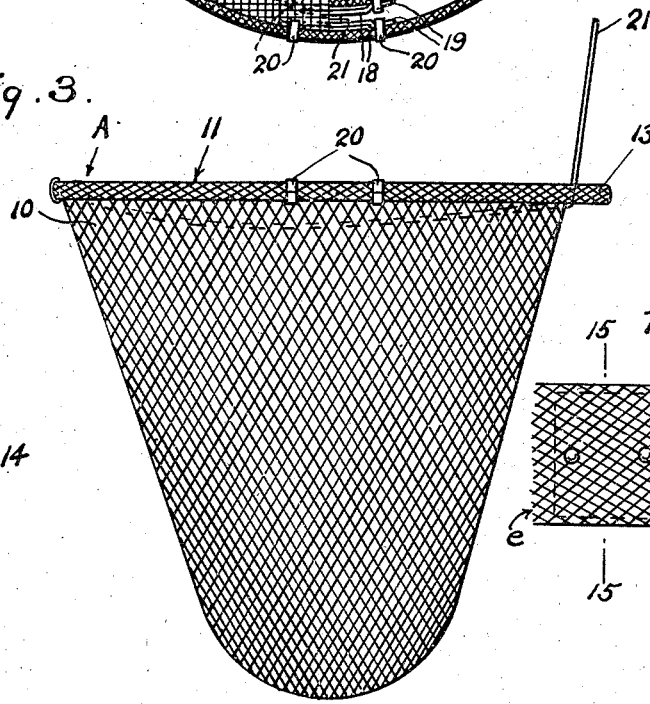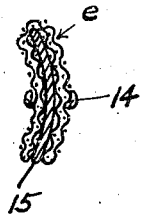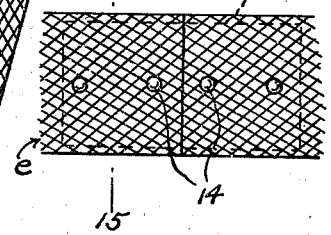

Aug. 14, 1945.   H. C. KRAMER   2,382,319
CRAB NET
Filed May 8, 1944   3 Sheets-Sheet 3
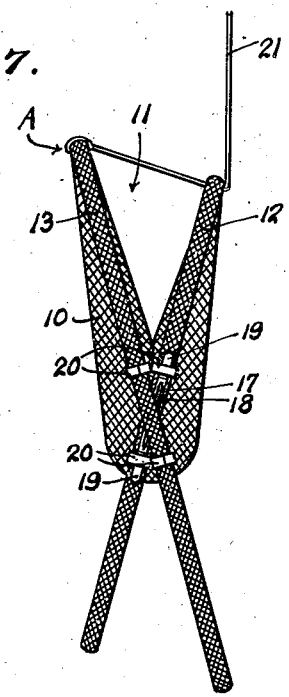
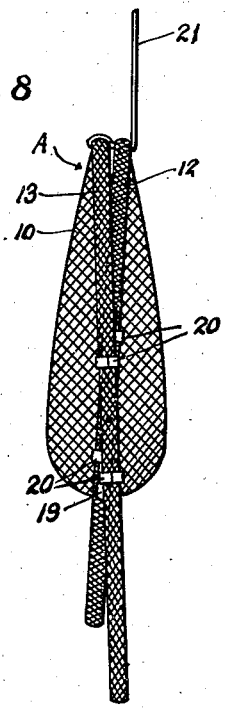
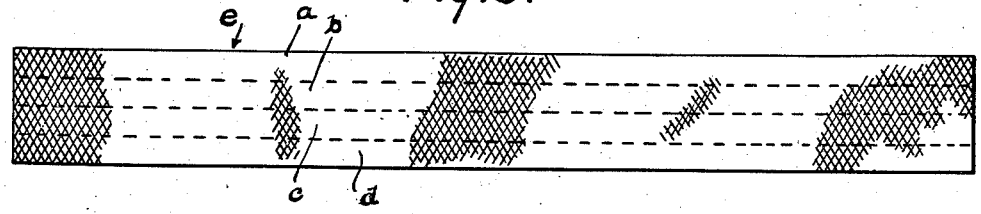
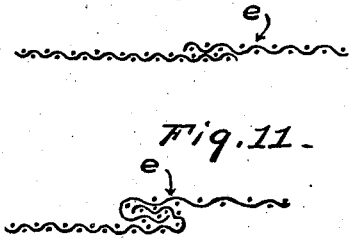
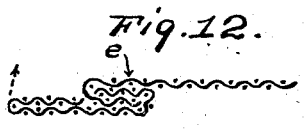
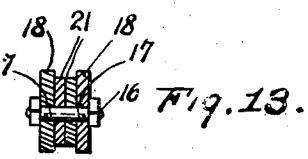
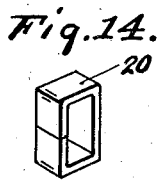
INVENTOR.
Herman C. Kramer
BY
Victor J. Evans & Co.
ATTORNEYS Patented Aug. 14, 1945

2,382,319

UNITED STATES PATENT OFFICE 2,382,319

CRAB NET

Herman C. Kramer, New York, N. Y.

Application May 8, 1944, Serial No. 534,600

4 Claims. (Cl. 43—7)

The invention relates to a fishing net, and more particularly to a fisherman's crab net.

The primary object of the invention is the provision of a net of this character, wherein the construction thereof is novel, in that it is foldable so that it can be conveniently handled for the lowering thereof from a boat or the like onto the river bottom at a crab bed, and on reaching the bottom of the river it will open into a position so that crabs can be caught therein, whence the catch can be lifted to the boat or the like without escape of the catch.

Another object of the invention is the provision of a net of this character, wherein the same involves wire-mesh hoops, these being adjustably connected together, so that the bag like net proper can be collapsed or extended in the handling of the structure.

A further object of the invention is the provision of a net of this character, wherein the fabric of the net proper is joined with the wire mesh hoops in a unique and novel manner, to be unitary therewith, and also this fabric will be extended and contracted on the swinging of the hoops, the latter being controlled by a draw line or the like, manually handled by a fiisherman or attendant.

A still further object of the invention is the provision of a net of this character, which is simple in construction, thoroughly reliable and efficient in operation, strong, durable, readily and easily controlled, and when it is extended and resting upon a river bed allows the crabs to crawl within the same.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 1 is an elevation showing the net constructed in accordance with the invention by full lines at rest upon a river bed, and by dotted lines the position of the net for retrieving thereof.

Figure 2 is a top plan view showing the net extended.

Figure 3 is a side view thereof.

Figure 4 is a fragmentary plan view showing in detail the hoop arrangement and pivotal connection thereof with the net removed.

Figure 5 is a sectional view taken on the line 5—5 of Figure 4 looking in the direction of the arrows.

Figure 6 is a sectional view taken on the line 6—6 of Figure 4 looking in the direction of the arrows.

Figure 7 is a side view of the net partly folded.

Figure 8 is a similar view of the net completed folded.

Figure 9 is a plan view of one of the wire hoop blanks.

Figure 10 is an edge view showing the first step in the arrangement of the hoop and net for the joining thereof.

Figure 11 is a similar view of the second step of folding together of the blank and net.

Figure 12 is a similar view of the final fold thereof.

Figure 13 is a sectional view taken on the line 13—13 of Figure 4.

Figure 14 is a perspective view of one of the retaining loops.

Figure 15 is a sectional view taken on the line 15—15 of Figure 16.

Figure 16 is a fragmentary plan view at the connected ends of a hoop of the net.

Similar reference characters indicate corresponding parts throughout the several views in the drawings.

Referring to the drawings in detail A designates generally a foldable crab net constructed in accordance with the invention and hereinafter set forth in detail.

The net A comprises a flexible cord net body 10 of the required size and is in contour basket-like having an open mouth end 11, the marginal edge of which for approximately one-half extent thereof is interfolded with the folds a, b, c, and d, respectively of a pair of hoops 12 and 13, respectively. Each hoop is made from a single blank e of wire mesh fabric, with its ends when in hoop form and folded as before stated riveted at 14 to an inter-fitted connector plate 15, as is clearly shown in Figures 15 and 16 of the drawings.

The hoops 12 and 13 are adapted to be concentrically arranged with respect to each other, the hoop 12 being in diameter less than the hoop 13, which latter is the outermost one, while the hoop 12 is the innermost one. These hoops 12 and 13 at their transverse center axes are pivoted together at diametrically opposite points by pivot bolts 16, each being shiftably engaged in elongated slots 17 provided in hinging strips 18, having the laterally off-set ends 19, for fitting in retaining loops 20, which embrace the companion hoop 12 and 13 at opposite sides of the bolt 16, so that in this manner the hoops are swingingly connected together for the extending and folding of the body 10.

The bolts 16 carry washers 21 which serve as spacers, they being located between the strips 18 adjacent to each other. The hoops 12 and 13 when swung into a plane with each other completely spread the mouth end 11 of the body 10 for the opening of such mouth. The hoops 12 and 13 are in this condition when the net A has settled on to the river bed, so that crabs can crawl into the body 10 for the catching thereof in a haul of the said net A. The fullness of the body 10 during the settling of the net A crowds into the said body when completely settled onto the river bottom or bed.

Connected to the hoop 13 at one side thereof centrally between its pivotal connection with the hoop 12 is a tow line or cable 21, which is loosely threaded through the net body 10 beneath the hoop 12 at a central point thereof between its pivotal connection with the hoop 12, and thence this line or cable 21 is extended into the boat 22 or the like where it may be anchored. This line or cable 21 functions to close the mouth of the body 10 when pulled upon, and also to lift the net A into the boat or the like when a catch of crabs has been made, as well as to allow the mouth 11 of the body 10 to open fully on the settling of the hoops 12 and 13 upon the river bottom or bed when the net A is let out from the boat or the the like onto the bottom or bed of the river for the trapping or catching of crabs.

The hoops 12 and 13 will positively open the body 10 when the net A reaches the bed or bottom of the river, in that the hoop 13 first makes contact therewith and the hoop 12 automatically effects a scissors action, it being free to swing when the line or cable 21 slackens after the overcast of the net A from the boat or the like.

The net A can be readily stored within the boat or the like when not in use and will not occupy excessive space, it being readily and easily handled and when the body 10 has its mouth 11 closed there can be no escape of the crabs caught in the net A.

What is claimed is:

1. A net of the kind described, comprising a pair of interfitting hoops pivotally connected for swinging movements relative to each other, and a flexible bag-like net body having an open mouth connected with the hoops for the opening and closing of the said mouth on the swinging of said hoops.

2. A net of the kind described, comprising a pair of interfitting hoops pivotally connected for swinging movements relative to each other, a flexible bag-like net body having an open mouth connected with the hoops for the opening and closing of the said mouth on the swinging of said hoops, and folded areas in the hoops for the interfolding of the edge of the mouth of the body therewith.

3. A net of the kind described, comprising a pair of interfitting hoops pivotally connected for swinging movements relative to each other, a flexible bag-like net body having an open mouth connected with the hoops for the opening and closing of the said mouth on the swinging of said hoops, folded areas in the hoops for the interfolding of the edge of the mouth of the body therewith, and displaceable pivots swingingly connecting the hoops together.

4. A net of the kind described, comprising a pair of interfitting hoops pivotally connected for swinging movements relative to each other, a flexible bag-like net body having an open mouth connected with the hoops for the opening and closing of the said mouth on the swinging of said hoops, folded areas in the hoops for the interfolding of the edge of the mouth of the body therewith, displaceable pivots swingingly connecting the hoops together, and a tow line operably connected to said hoops for effecting the opening and closing of the mouth of the body and the swinging of the hoops relative to each other.

HERMAN C. KRAMER.